(12) United States Patent
Dibbad et al.

(10) Patent No.: US 11,630,694 B2
(45) Date of Patent: Apr. 18, 2023

(54) CORE VOLTAGE REGULATOR ENERGY-AWARE TASK SCHEDULING

(71) Applicant: QUALCOMM INCORPORATED, San Diego, CA (US)

(72) Inventors: Vijayakumar Ashok Dibbad, Bangalore (IN); Bharat Kumar Rangarajan, Bangalore (IN); Prashanth Kumar Kakkireni, Hyderabad (IN); Srinivas Turaga, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 17/148,314

(22) Filed: Jan. 13, 2021

(65) Prior Publication Data

US 2022/0222112 A1 Jul. 14, 2022

(51) Int. Cl.
*G06F 9/46* (2006.01)
*G06F 9/48* (2006.01)
*G06F 1/28* (2006.01)
*G06F 9/52* (2006.01)

(52) U.S. Cl.
CPC .............. *G06F 9/4893* (2013.01); *G06F 1/28* (2013.01); *G06F 9/52* (2013.01)

(58) Field of Classification Search
CPC ............. G06F 9/4893; G06F 1/28; G06F 9/52
See application file for complete search history.

(56) References Cited

U.S. PATENT DOCUMENTS

| | | |
|---|---|---|
| 2014/0068290 A1 | 3/2014 | Bhandaru et al. |
| 2015/0178138 A1 | 6/2015 | Saha et al. |
| 2016/0139655 A1 | 5/2016 | Chen et al. |
| 2017/0255239 A1 | 9/2017 | Matteson et al. |
| 2018/0314308 A1 | 11/2018 | Savidis et al. |

OTHER PUBLICATIONS

International Search Report and Written Opinion—PCT/US2021/061640—ISA/EPO—dated Mar. 25, 2022.

*Primary Examiner* — Gregory A Kessler
(74) *Attorney, Agent, or Firm* — Smith Tempel Blaha LLC/Qualcomm

(57) ABSTRACT

Task scheduling in a computing device may be based in part on voltage regulator efficiency. For an additional task to be scheduled, multiple task scheduling cases may be determined that represent execution of the additional task on each of a number of processors concurrently with one or more other tasks executing among the processors. For each task scheduling case, a regulator input power level for a voltage regulator may be determined based on a performance level indication associated with the additional task, the one or more other tasks executing on the processors, and the efficiency level of each voltage regulator. For each task scheduling case, a total regulator input power level may be determined by summing the regulator input power levels for all voltage regulators. The additional task may be executed on a processor associated with a task scheduling case for which total regulator input power is lowest.

34 Claims, 9 Drawing Sheets

CORE VOLTAGE REGULATOR ENERGY-AWARE TASK SCHEDULING

DESCRIPTION OF THE RELATED ART

Portable computing devices ("PCD"s) are becoming necessities for people on personal and professional levels. These devices may include mobile phones, tablet computers, palmtop computers, portable digital assistants ("PDA"s), portable game consoles, and other portable electronic devices. PCDs commonly contain integrated circuits or systems-on-a-chip ("SoC"s) that include numerous components or subsystems designed to work together to deliver functionality to a user. For example, an SoC may contain any number of processing engines, such as central processing units ("CPU"s), graphical processing units ("GPU"s), digital signal processors ("DSP"s), neural processing units ("NPU"s), wireless transceiver units (also referred to as modems), etc.

A processing engine, such as a CPU, may have multiple cores, which are capable of executing tasks independently of one another. The cores may be symmetric, where each core is capable of the same level of performance as the others, or asymmetric (also referred to as heterogeneous), where one or more cores are optimized for higher performance than others. Cores may be organized in clusters. In some heterogeneous architectures, one cluster may consist of cores optimized for higher performance than the cores of another cluster. The higher-performance cores generally consume more power than the lower-performance cores. The process of determining on which of multiple cores to execute which of multiple tasks is commonly referred to as task scheduling. Task scheduling may be controlled by a scheduler, which is commonly a part of an operating system kernel.

Task scheduling that attempts to minimize the total amount of energy consumed by all executing tasks may be referred to as energy-aware scheduling ("EAS"). To determine on which core it would be most efficient to execute a task, a scheduler employing EAS may apply an estimate of the processing load that the task would place on each core to a model that relates processing load (i.e., performance) to power. The scheduler then selects the core on which the model indicates that executing the task would minimize total power.

SUMMARY OF THE DISCLOSURE

Systems, methods, computer readable mediums, and other embodiments are disclosed for regulator efficiency-aware task scheduling in a computing device.

An exemplary method for task scheduling in a computing device may include receiving a task comprising a task performance level indication, and determining a plurality of task scheduling cases. In the exemplary method, each task scheduling case may represent execution of the task on an associated processor of a plurality of processors concurrently with one or more other tasks executing on the plurality of processors. In the exemplary method, each processor may be supplied by one of a plurality of voltage regulators. The exemplary method may also include determining, for each task scheduling case, a regulator input power level of each voltage regulator based on the task performance level indication, the one or more other tasks executing on the processors, and an efficiency level of each voltage regulator. The exemplary method may further include determining, for each task scheduling case, a total regulator input power level by summing the regulator input power levels of the voltage regulators. The exemplary method may still further include selecting one of the task scheduling cases having a lowest total regulator input power level among the plurality of task scheduling cases. The exemplary method may yet further include executing the task on a processor associated with the selected one of the task scheduling cases.

An exemplary system for task scheduling in a computing device may include a plurality of processors, a task scheduler, and a plurality of voltage regulators. The task scheduler may be configured to receive a task comprising a task performance level indication, and determine a plurality of task scheduling cases. In the exemplary system, each task scheduling case may represent execution of the task on an associated processor concurrently with one or more other tasks executing on the processors. In the exemplary system, each processor may be supplied by one of the voltage regulators. In the exemplary system, the task scheduler may also be configured to determine, for each task scheduling case, a regulator input power level of each voltage regulator based on the task performance level indication, the one or more other tasks executing on the processors, and an efficiency level of each voltage regulator. In the exemplary system, the task scheduler may further be configured to determine, for each task scheduling case, a total regulator input power level by summing the regulator input power levels of the voltage regulators. In the exemplary system, the task scheduler may still further be configured to select one of the task scheduling cases having a lowest total regulator input power level among the plurality of task scheduling cases. In the exemplary system, the task scheduler may yet further be configured to execute the task on a processor associated with the selected one of the task scheduling cases.

Another exemplary system for task scheduling in a computing device may include means for receiving a task comprising a task performance level indication, and means for determining a plurality of task scheduling cases. In the exemplary system, each task scheduling case may represent execution of the task on an associated processor of a plurality of processors concurrently with one or more other tasks executing on the processors. In the exemplary system, each processor may be supplied by one of a plurality of voltage regulators. The exemplary system may also include means for determining, for each task scheduling case, a regulator input power level of each voltage regulator based on the task performance level indication, the one or more other tasks executing on the processors, and an efficiency level of each voltage regulator. The exemplary system may further include means for determining, for each task scheduling case, a total regulator input power level by summing the regulator input power levels of the voltage regulators. The exemplary system may still further include means for selecting one of the task scheduling cases having a lowest total regulator input power level among the plurality of task scheduling cases. The exemplary system may yet further include means for executing the task on a processor associated with the selected one of the task scheduling cases.

An exemplary computer readable medium for task scheduling in a computing device may comprise a non-transitory computer-readable medium having instructions stored thereon in computer-executable form. The instructions, when executed by a processing system of the computing device, may configure the processing system to receive a task comprising a task performance level indication, and determine a plurality of task scheduling cases. In the exemplary computer readable medium, each task scheduling case may represent execution of the task on an associated processor of a plurality of processors concurrently with one or more other tasks executing on the processors. In the exemplary computer readable medium, each processor may be supplied by one of a plurality of voltage regulators. The instructions may also configure the processing system to determine, for each task scheduling case, a regulator input power level of each of the voltage regulators based on the task performance level indication, the one or more other tasks executing on the processors, and an efficiency level of each voltage regulator. The instructions may further configure the processing system to determine, for each task scheduling case, a total regulator input power level by summing the regulator input power levels of the voltage regulators. The instructions may still further configure the processing system to select one of the task scheduling cases having a lowest total regulator input power level among the plurality of task scheduling cases. The instructions may yet further configure the processing system to execute the task on a processor associated with the selected one of the task scheduling cases.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects. The term "coupled" may be used herein to mean connected via zero or more intervening elements, in contrast with the term "directly connected," which may be used herein to mean connected via no intervening elements.

A reference to a task executing on a processor means that the software (instructions, data, etc.) represented by the task is executed by a processor retrieving and executing portions of the software from a memory, storing results in a memory, etc., in a manner in accordance with conventional computing principles well understood by one of ordinary skill in the art. In some of the exemplary embodiments described herein, an explicit description of such a memory may be omitted for purposes of clarity.

Figure 1:
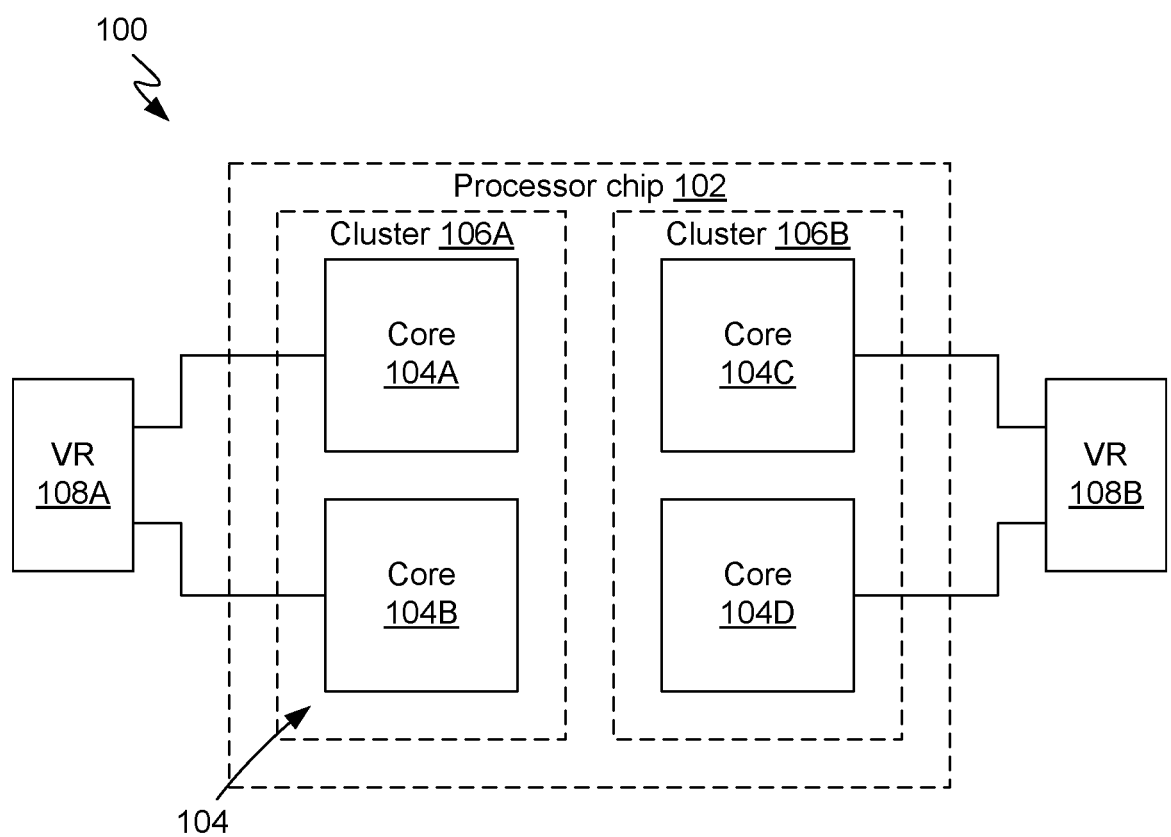
FIG. 1 is a block diagram illustrating a task scheduling system in a computing device having multiple clusters of cores, in accordance with exemplary embodiments.

As illustrated in FIG. 1, in an illustrative or exemplary embodiment, a computing device 100 may include a processor chip 102. The processor chip 102 may be, for example, a CPU (sometimes also referred to as an application processor). The processor chip 102 may have multiple cores 104, such as cores 104A, 104B, 104C and 104D. Although in the illustrated embodiment the processor chip 102 has four cores 104, in other embodiments such a processor chip may have any other number of cores. The cores 104A and 104B may be organized in a first cluster 106A, and the cores 104C and 104D may be organized in a second cluster 106B. Although in the illustrated embodiment the cores 104 are organized in two clusters 106A and 106B, in other embodiments the cores may be organized in any other number of clusters. In some embodiments, the cores 104A and 104B of the first cluster 106A may be configured to sustain a higher processing load or higher performance level (expressed, for example, in millions of instructions per second or "MIPS") than the cores 104C and 104D of the second cluster 106B. As used in this disclosure, the terms "higher performance" and "lower performance" refer to performance levels relative to each other. Nevertheless, in other embodiments all such cores may be capable of sustaining the same maximum processing load.

A first voltage regulator 108A may be configured to supply power to the cores 104A and 104B of the first cluster 106A. Similarly, a second voltage regulator 108B may be configured to supply power to the cores 104C and 104D of the second cluster 106B. In the exemplary embodiments described herein, the term "power" refers an amount of current at a regulated voltage. Although not shown in FIG. 1 for purposes of clarity, the regulated voltage or voltages may be selected or adjusted by power management circuitry of the computing device 100 that provides voltage control signals to the voltage regulators 108A and 108B. As described below in further detail, in some embodiments the voltage regulators 108A and 108B may be different from each other, such as having different efficiencies. Nevertheless, in other embodiments such voltage regulators may be similar to each other, such as having the same efficiencies.

Other elements of the computing device 100 in addition to the above-described processor chip 102 and voltage regulators 108A and 108B, may include, for example, one or more memories, other processors, input/output systems, data communication busses, power management circuitry, etc. Such other elements are not shown in FIG. 1 for purposes of clarity.

Figure 2:
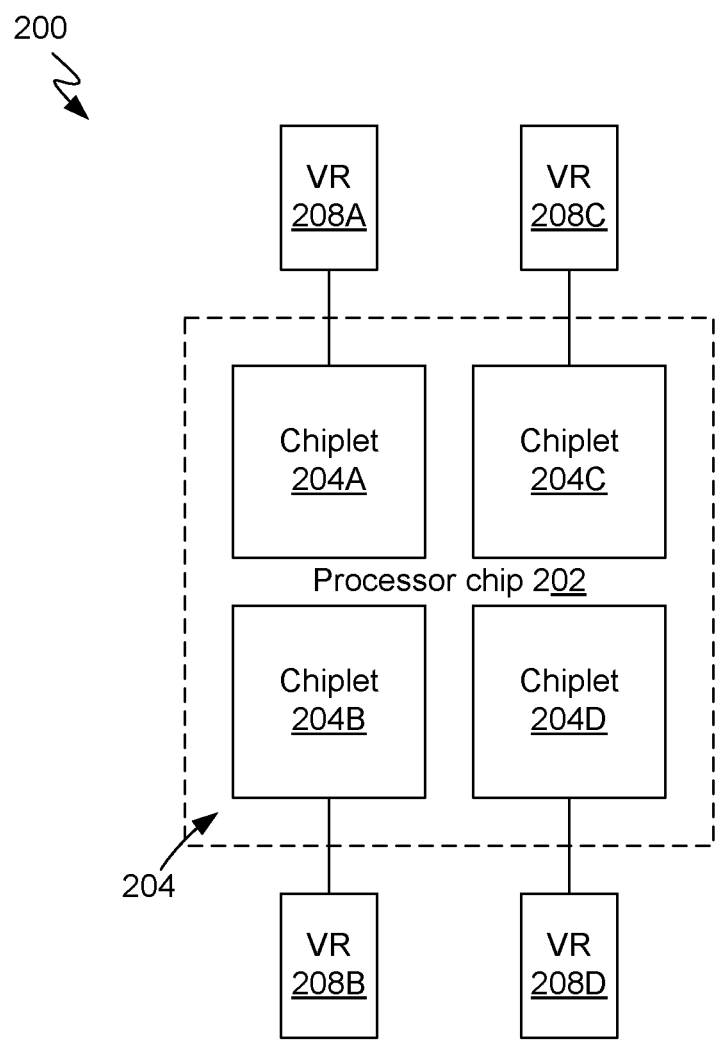
FIG. 2 is a block diagram illustrating a task scheduling system in a computing device having multiple chiplets, in accordance with exemplary embodiments.

As illustrated in FIG. 2, in another exemplary embodiment a computing device 200 may include a processor chip 202. The processor chip 202 may be, for example, a CPU or application processor. The processor chip 202 may comprise multiple chiplets 204, such as chiplets 204A, 204B, 204C and 204D. Although in the illustrated embodiment the processor chip 202 has four chiplets 204, in other embodiments such a processor chip may have any other number of chiplets. Voltage regulators 208A, 208B, 208C and 208D may be configured to supply power to the chiplets 204A, 204B, 204C and 204D, respectively. Other elements of the computing device 200 in addition to the above-described processor chip 202 and voltage regulators 208A, 208B, 208C and 208D, may include, for example, one or more memories, other processors, input/output systems, data communication busses, etc. Such other elements are not shown in FIG. 2 for purposes of clarity.

Figure 3A:
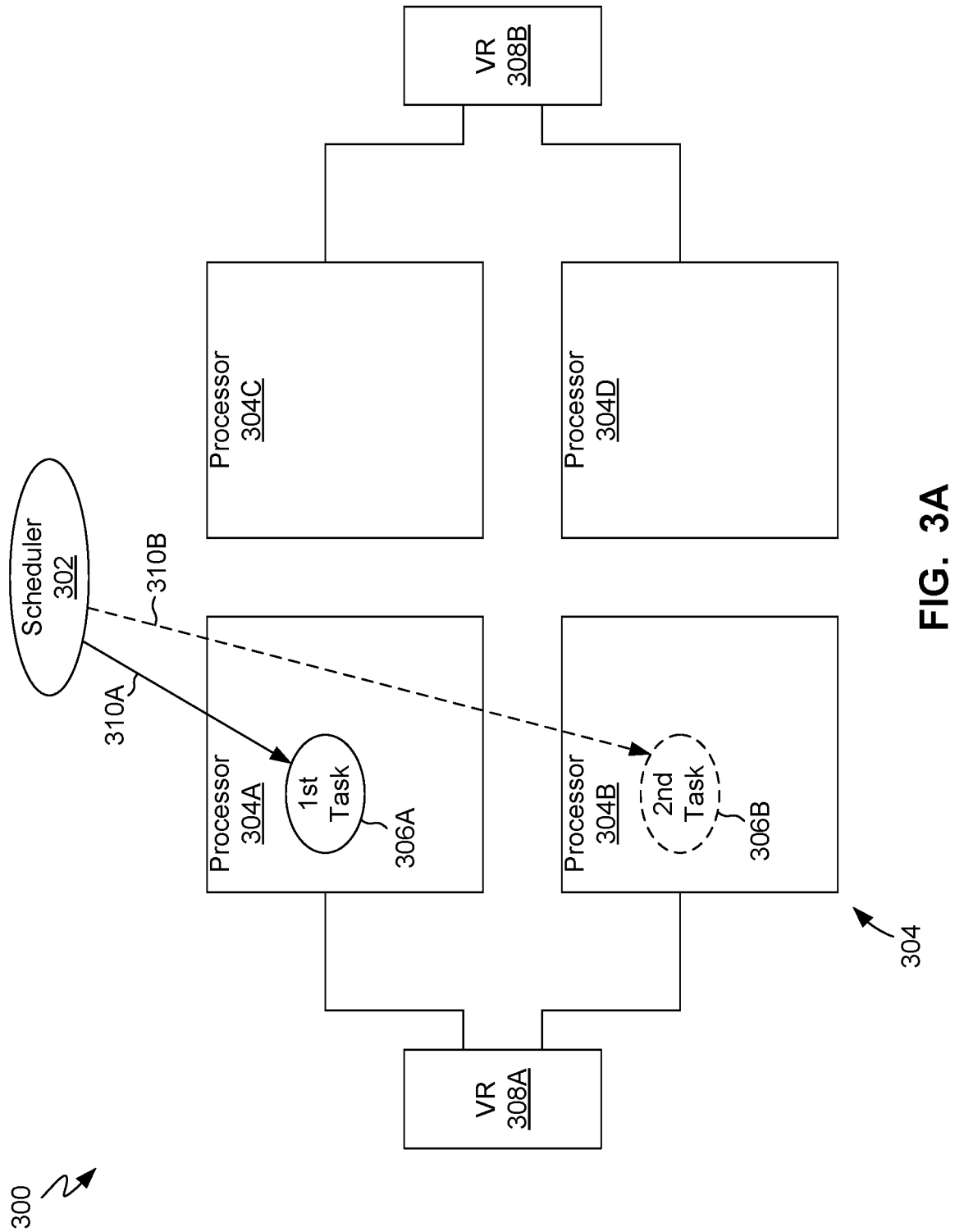
FIG. 3A illustrates a first example of a task scheduling case in a method for task scheduling in a computing device, in accordance with exemplary embodiments.
Figure 3B:
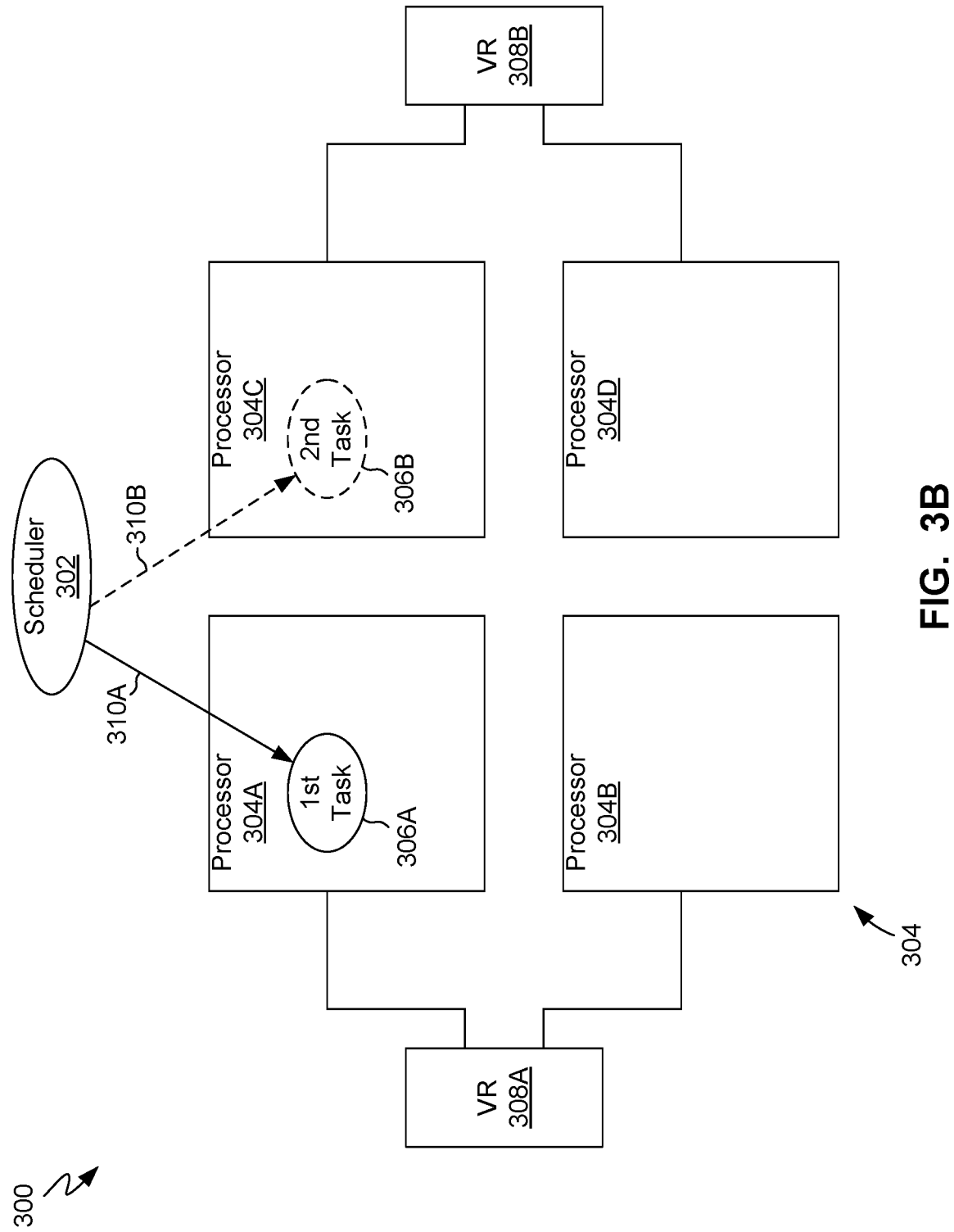
FIG. 3B illustrates a second example of a task scheduling case in a method for task scheduling in a computing device, in accordance with exemplary embodiments.
Figure 3C:
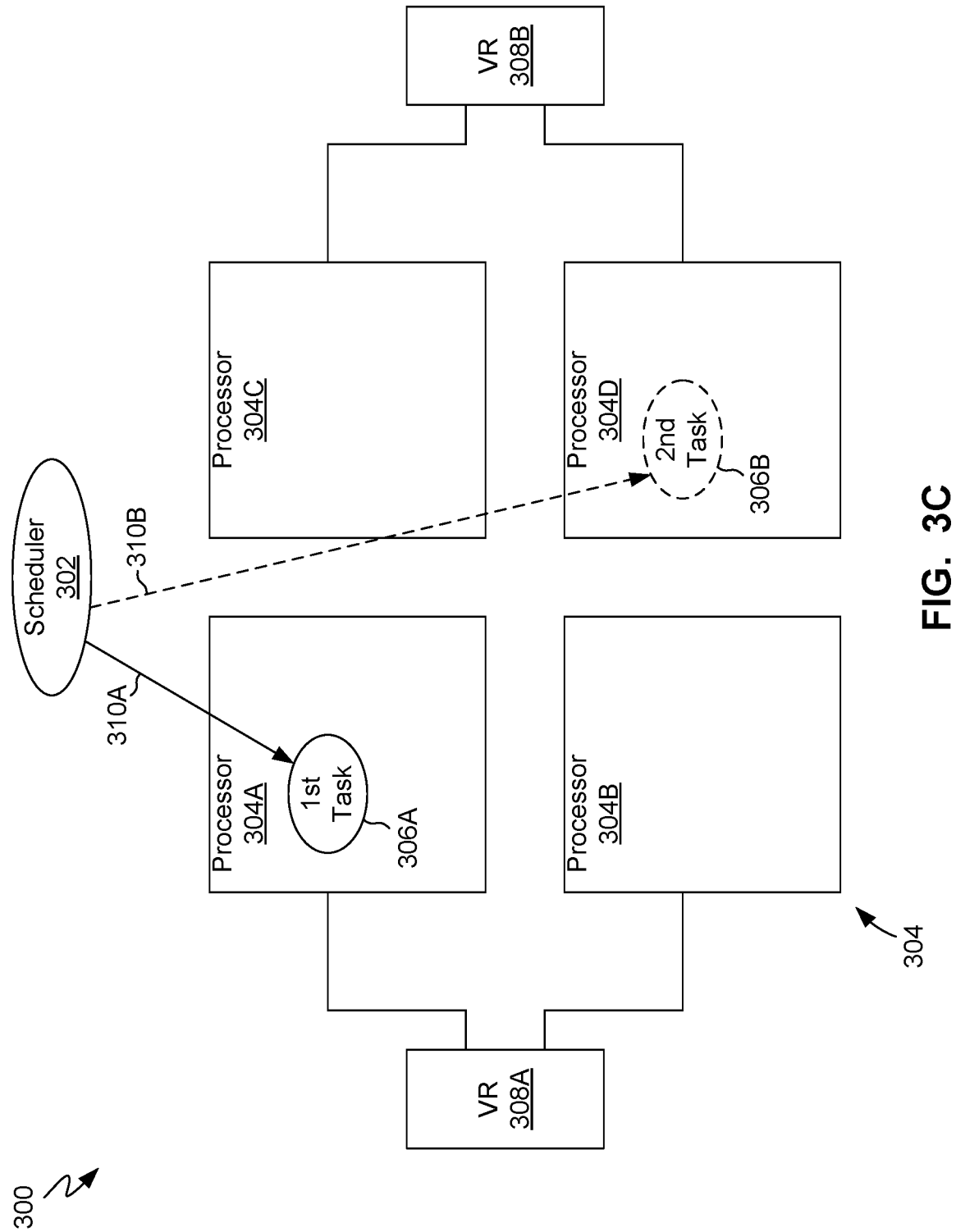
FIG. 3C illustrates a third example of a task scheduling case in a method for task scheduling in a computing device, in accordance with exemplary embodiments.

As illustrated in FIGS. 3A-3C, a system 300 may include a task scheduler 302 and processors 304, such as processors 304A, 304B, 304C and 304D. The processors 304 may be an example of the above-described cores 104 (FIG. 1) or chiplets 204 (FIG. 2), or any other group of two or more processors. Also, although in the above-described embodiments all of the cores 104 are included in a single chip 102, and all of the chiplets 204 are included in a single chip 202, in other embodiments such processors may be in separate chips. In the following descriptions, the term "processor" encompasses all such processors that may be contained in one or more chips. Further, although in the illustrated embodiment the system 300 has four processors 304, in other embodiments such a system may have any other number of processors.

Voltage regulators may supply power to the processors 304 in the manner described above with regard to FIGS. 1-2. For example, a first voltage regulator 308A may supply power to the processors 304A and 304B, and a second voltage regulator 308B may supply power to the processors 304C and 304D.

In the embodiment illustrated in FIGS. 3A-3C, the task scheduler 302 may correspond to a portion or feature of an operating system (not shown). That is, the task scheduler 302 may comprise a portion of a processor, such as any of the processors 304 or other processor (not shown), configured by the execution of operating system software, including task scheduling software.

The term "task scheduling" or "scheduling" refers to selecting one of the processors 304 on which to execute a task. In an example of operation of the system 300, a first task 306A may be executing on the processor 304A when the scheduler 302 receives (e.g., from another portion of the operating system) an indication of an additional or second task 306B to be scheduled. The arrow 310A conceptually indicates that the scheduler 302 may have previously (i.e., prior to receipt of the indication of the second task 306B) scheduled the first task 306A to execute on the processor 304A. In response to the indication of the second task 306B, the scheduler 302 may select one of the processors 304 to execute the second task 306B. As described below, three alternative ways to schedule an additional task, referred to herein as "task scheduling cases," are shown in FIGS. 3A, 3B and 3C, respectively. Broadly, the additional or second task 306B could potentially be executed on any of the four processors 304A, 304B, 304C and 304D. Nevertheless, in this example a set of candidate processors for executing the second task 306B may be identified or determined in accordance with conventional task scheduling principles. Conventionally, the most task-loaded processor or processors, if any, would be excluded from the set of candidate processors for executing an additional task. That is, the least-loaded processor or processors form the set of candidates. In this example, where the processor 304A is executing the first task 306A while none of the other processors 304B, 304C and 304D are executing any tasks, the processors 304B, 304C and 304D form the set of candidate processors for executing the second task 306B.

For example, as conceptually indicated by the arrow 310B in FIG. 3A, and based on a method described below, the scheduler 302 may schedule the second task 306B to execute on the processor 304B rather than any of the other processors 304A, 304C and 304D. That is, the scheduler 302 may select one of the processors 304 on which to execute the second task 306B. As described below, the method may base the selection in part on voltage regulator efficiency. Although only two tasks 306A and 306B are shown in FIGS. 3A-3C for purposes of example, any number of tasks may be executing concurrently with each other, distributed among any number of processors.

Figure 4:
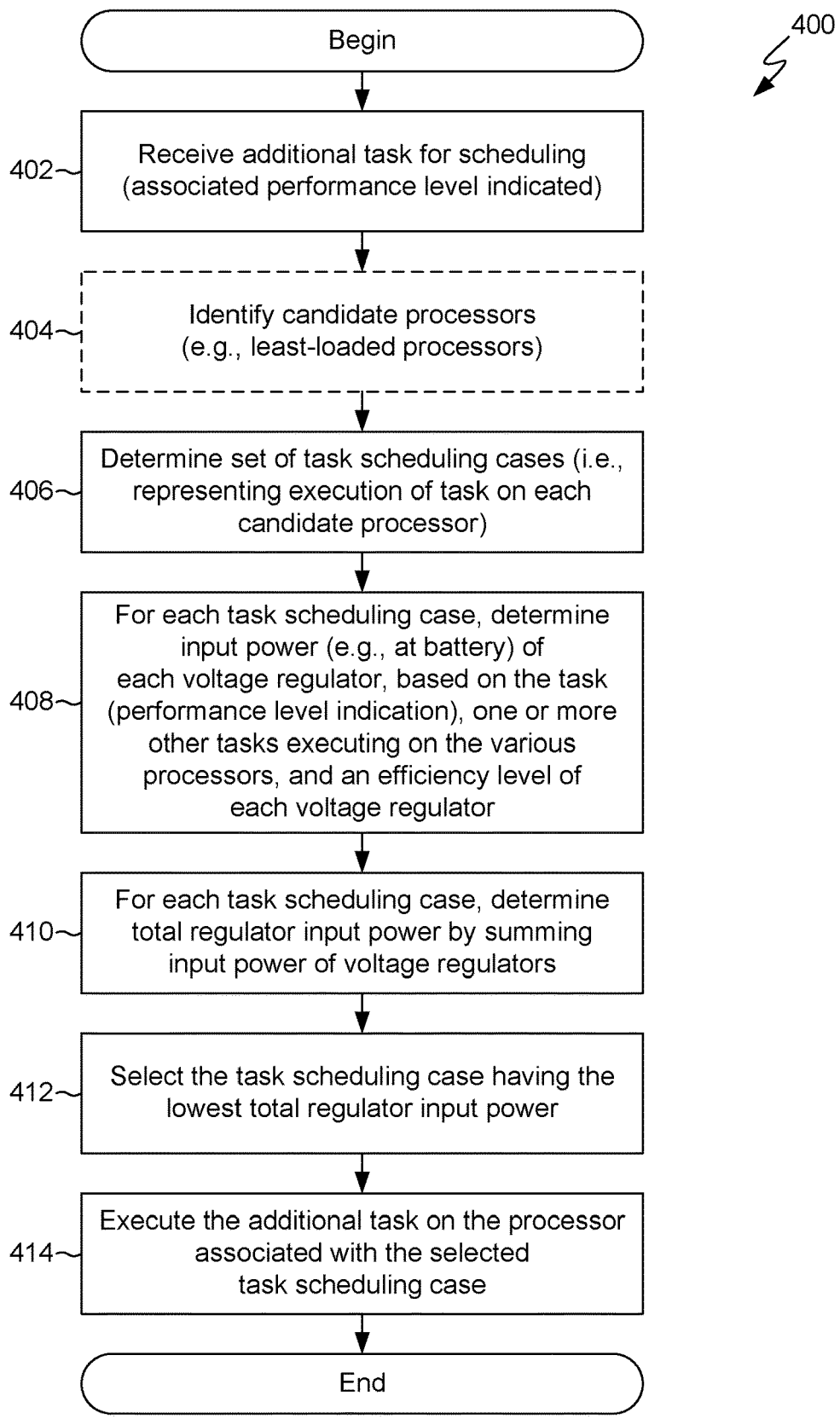
FIG. 4 is a flow diagram illustrating a method for task scheduling in a computing device, in accordance with exemplary embodiments.

As illustrated in FIG. 4, a method 400 for task scheduling in a computing device may include the following. It should be understood that the method 400 represents an example or embodiment, and in other embodiments some steps of the method 400, or similar steps or acts, may occur in a different order than in the method 400, or may be omitted. For purposes of example, the method 400 may be described in relation to one or more of the computing devices 100 (FIG. 1) or 200 (FIG. 2) or the system 300 (FIG. 3). Nevertheless, the method 400 or a related method may be applied to other computing devices, systems, etc. Further, the numerical values of currents, voltages, etc., set forth below are provided for purposes of example and may be different in other examples.

As indicated by block 402, an additional task may be received. That is, an indication of an additional task to be scheduled is received. The indication may comprise an indication of a task performance level. The task performance level may relate, for example, to a number of MIPS, or a similar measure of performance, that a processor may need to sustain to execute the task. The additional task may be received by, for example, the above-described task scheduler 302 (FIGS. 3A-3C).

As indicated by block 404, two or more candidate processors for executing the additional task may be identified or determined. The candidate processors may be determined by, for example, the task scheduler 302. Conventional methods may be employed for identifying candidate processors, such as identifying the least-loaded processor or processors. Referring to the example described above with regard to FIGS. 3A-3C, in which the additional or second task 306B is received while the processor 304A is executing the first task 306A and none of the other processors 304B, 304C and 304D are executing any tasks, each of the processors 304B, 304C and 304D is a least-loaded processor and a candidate for executing the second task 306B while the first task 306A is concurrently executing on the processor 304A.

As indicated by block 406, two or more task scheduling cases may be determined. A task scheduling case in accordance with exemplary embodiments described herein is a representation of a state in which the additional task is executing on a selected one of the (candidate) processors concurrently with one or more other tasks executing among the processors. As indicated by FIGS. 3A-3C, there may be three task scheduling cases. As shown in FIG. 3A, one of the task scheduling cases may represent the additional or second task 306B executing on the processor 304B while the first task 306A is executing on the processor 304A. As shown in FIG. 3B, another task scheduling case could represent the second task 306B executing on the processor 304C while the first task 306A is executing on the processor 304A. As shown in FIG. 3C, still another task scheduling case could represent the second task 306B executing on the processor 304D while the first task 306A is executing on the processor 304A. The number of task scheduling cases that may be determined in block 406 may correspond to the number of candidate processors. In each task scheduling case, a different one of the candidate processors may be considered for executing the additional task. Although FIGS. 3A-3C illustrate a straightforward example in which only one task 306A is executing at the time the scheduler 302 receives the additional or second task 306B, there may be other examples of operation in which many tasks are distributed and executing among the various processors 304 at the time the scheduler 302 receives an additional task to be scheduled.

As indicated by block 408, a regulator input power level of each voltage regulator may be determined for each task scheduling case. The term "regulator input" is used in this disclosure to refer to the power source side of a voltage regulator, in contrast with the term "regulator output," which refers to the power sink side of the voltage regulator that the voltage regulator attempts to maintain at a ("regulated") voltage level. An example of a power source is a battery (not shown).

The regulator input power level for a task scheduling case represents the amount of power that the voltage regulator would draw at its input (e.g., from a battery or other power source) under an operating state in which the one or more processors supplied by that voltage regulator are executing the one or more tasks represented by that task scheduling case. To determine the regulator input power level of a voltage regulator for one of the task scheduling cases, the scheduler 302 may, for example, utilize one or more look-up tables (not shown), calculations, or a combination of look-up tables and calculations. The regulator input power level for a task scheduling case may be based in part on the task performance level indication for the additional task as well as the performance levels or other indications of processor load for any other tasks that may execute on the processor or processors supplied by that regulator under that task scheduling case. Significantly, the regulator input power level may further be based in part on regulator efficiency.

The scheduler 302 may, for example, utilize a look-up table (not shown) to determine the regulator input power in response to the performance levels or indications of processor load. Such a table may be based in part on regulator efficiency. That is, a relationship between the input power level of a voltage regulator and processor load, as provided by, for example, a table, may take into account the efficiency level of the voltage regulator. Regulator efficiency refers to the percentage of the input power level that the voltage regulator is capable of providing at its output, i.e., regulator output power level. As described above, the voltage regulator output is coupled to one or more processors, while the voltage regulator input may be coupled to a power source, such as a battery.

Referring again to the example shown in FIGS. 3A-3C, the output of the first voltage regulator 308A is coupled to, and thus supplies current to, the processors 304A and 304B, and the output of the second voltage regulator 308B is coupled to, and thus supplies current to, the processors 304C and 304D. In accordance with block 408, the input power level of the first voltage regulator 308A may be determined for each task scheduling case, and the input power level of the second voltage regulator 308B may be determined for each task scheduling case. An input power level of each of the voltage regulators 308A and 308B may be determined for the task scheduling case shown in FIG. 3A, the task scheduling case shown in FIG. 3B, and the task scheduling case shown in FIG. 3C.

For the task scheduling case shown in FIG. 3A, in which the first task 306A executes on the processor 304A and the additional or second task 306B executes on the processor 304B, the input power level of the voltage regulator 308A may be determined based on the processor load on the processor 304A associated with its execution of the task 306A and the processor load on the processor 304B associated with its execution of the task 306B, taking into account the efficiency of the voltage regulator 308A. For that same case of the first task 306A executing on the processor 304A and the additional or second task 306B executing on the processor 304B, the input power level of the voltage regulator 308B is zero.

For the task scheduling case shown in FIG. 3B, in which the first task 306A executes on the processor 304A and the additional or second task 306B executes on the processor 304C, the input power level of the voltage regulator 308A may be determined based on the processor load on the processor 304A associated with its execution of the task 306A, as the processor load on the processor 304B, which is not executing any tasks in this case, is zero. For that same case of the first task 306A executing on the processor 304A and the additional or second task 306B executing on the processor 304C, the input power level of the voltage regulator 308B may be determined based on the processor load on the processor 304C associated with its execution of the task 306B, as the processor load on the processor 304D, which is not executing any tasks in this case, is zero.

For the task scheduling case shown in FIG. 3C, in which the first task 306A executes on the processor 304A and the additional or second task 306B executes on the processor 304D, the input power level of the voltage regulator 308A may be determined based on the processor load on the processor 304A associated with its execution of the task 306A, as the processor load on the processor 304B, which is not executing any tasks in this case, is zero. For that same case of the first task 306A executing on the processor 304A and the additional or second task 306B executing on the processor 304D, the input power level of the voltage regulator 308B may be determined based on the processor load on the processor 304D associated with its execution of the task 306B, as the processor load on the processor 304C, which is not executing any tasks in this case, is zero.

Alternatively, or in addition to utilizing one or more lookup tables, or to produce such look-up tables, a regulator input power level may be determined by first determining a corresponding regulator output power level. Regulator output power level is a percentage of regulator input power level, where the percentage is the voltage regulator's efficiency level at the supply current level (i.e., the current that the voltage regulator is supplying). As described in further detail below, a voltage regulator's efficiency is not constant across the range of current it is capable of supplying. Regulator output power is the sum of the power drawn by the one or more processors that the regulator supplies. Determining regulator input power by first determining regulator output power may be illustrated through the example described above with regard to FIGS. 3A-3C.

In determining regulator output power for the task scheduling case shown in FIG. 3A, in which the first task 306A executes on the processor 304A and the additional or second task 306B executes on the processor 304B, the processor power level or amount of power required for each processor 304A and 304B to sustain its processing load may first be determined. The scheduler 302 may receive a task performance level indication having a value of N (e.g., "N" MIPS, where N is an integer greater than zero), which indicates the processing load that would be contributed by the additional task. The scheduler 302 may determine (e.g., using a look-up table) that to sustain a processing load of N MIPS, the processor 304B would require 2.14 W. The scheduler 302 may in the same manner determine that the processor 304A, in executing the task 306A, requires 2.14 A. Alternatively, in some embodiments, such as the embodiment shown in FIG. 2, the power drawn by a processor executing a task may be determined using telemetry readings of current and voltage from the voltage regulator supplying that processor.

A voltage regulator output power level may then be determined by summing the processor power levels of all processors supplied by that voltage regulator. For example, for the task scheduling case shown in FIG. 3A, in which the first task 306A executes on the processor 304A and the additional or second task 306B executes on the processor 304B, the scheduler 302 may determine that the output power of the voltage regulator 308A is 2.14 W+2.14 W=4.28 W. For the task scheduling case shown in FIG. 3A, the output power of the voltage regulator 308B is zero because no tasks execute on the processors 304C or 304D. The voltage regulator input power level may then be determined by dividing the voltage regulator output power level by the voltage regulator efficiency.

Figure 5:
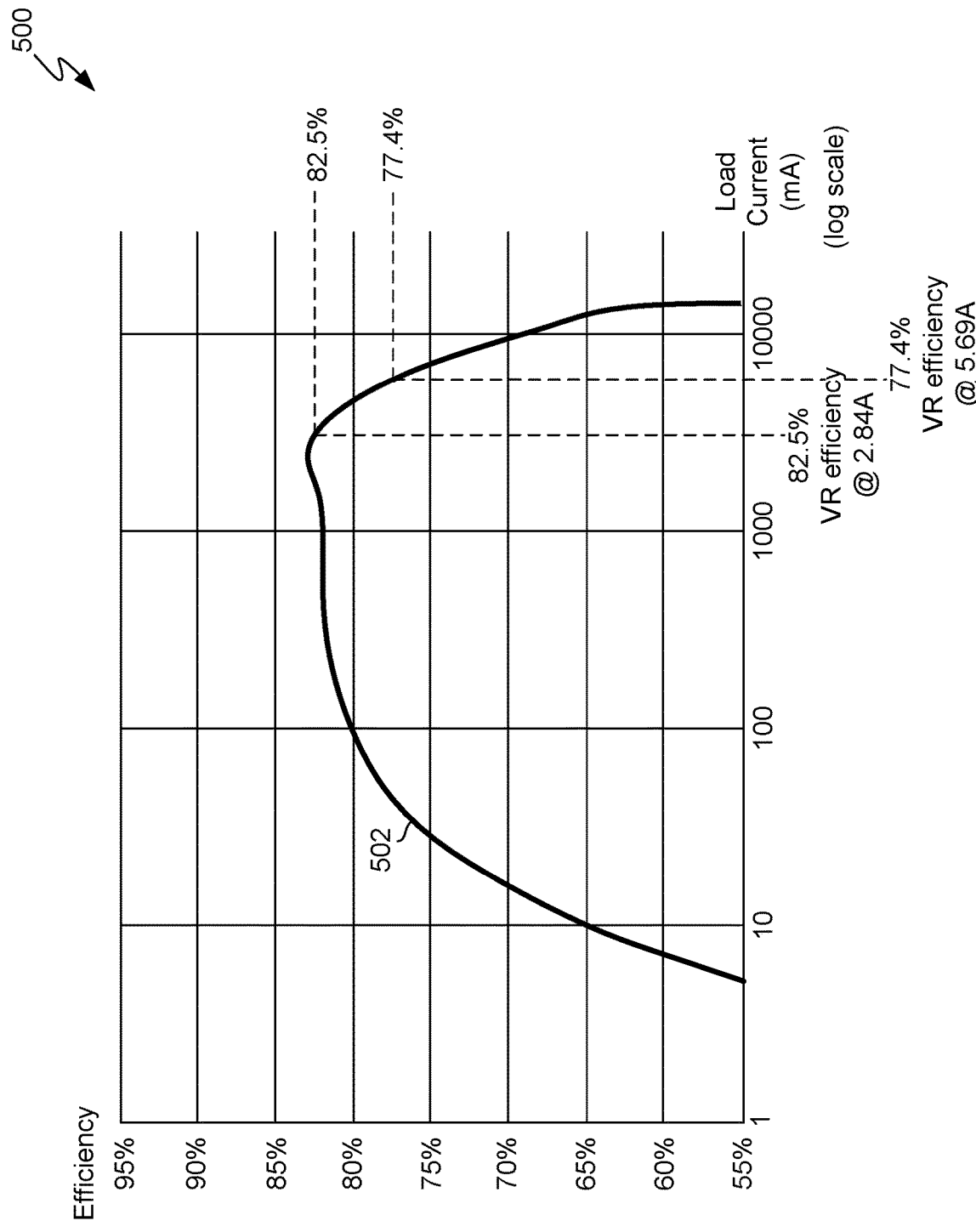
FIG. 5 is a graph showing an example of a voltage regulator efficiency curve.

As illustrated in FIG. 5, voltage regulator efficiency may be obtained from a model, which may be in the form of a graph 500 or a look-up table (not shown). The graph 500 comprises a curve 502 that relates voltage regulator load current (e.g., in mA) to efficiency (percentage). A voltage regulator load current level may be determined by dividing the voltage regulator output power level by the regulator output voltage level. Although only one curve 502 is shown, it should be appreciated that different voltage regulators may have efficiencies modeled by different curves. For purposes of the example shown in FIGS. 3A-3C, the curve 502 may describe the efficiencies of both voltage regulators 308A and 308B.

The calculated voltage regulator output power level may, in some embodiments, be adjusted by adding a calculated power supply plane loss. Power supply plane loss is the amount of power dissipated by the metal layer or plane in a circuit board (not shown) that distributes power from a voltage regulator. The power supply plane loss may be expressed as the product of resistance and the square of the regulator output current. The regulator output current may be determined by dividing the voltage regulator output power by the regulator output voltage. The regulator output voltage may be determined in some embodiments by telemetry, i.e., obtaining a measurement from the voltage regulator. For the task scheduling case shown in FIG. 3A, in which the output power of the voltage regulator 308A is 4.28 W and the measured voltage is, for example, 0.769 volts (V), the regulator output current is 4.28 W/0.769V=5.56 amperes (A). The resistance of a path between a voltage regulator output and a processor may be a predetermined value. In the example described above, in which the output power of the voltage regulator 308A is 4.28 W, and a path between the voltage regulator output and each processor 304A and 304B has a resistance of, for example, 3 milliohms, a power supply plane loss of $(5.56)^2 \times (0.003)$ or 0.092 may be added to the above-calculated voltage regulator output power of 4.28 W, resulting in an adjusted output power level of the voltage regulator 308A of 4.372 W.

Referring again to FIG. 5, for the task scheduling case shown in FIG. 3A the voltage regulator load current is 4.372 W/0.769V=5.69 A. The curve 502 indicates that at a load current level of 5.69 A, the efficiency level of the voltage regulator 308A is 77.4% or 0.774. Therefore, for the task scheduling case shown in FIG. 3A the input power level of the voltage regulator 308A is 4.372 W/0.774=5.65 W. Note that for the task scheduling case shown in FIG. 3A the input power level of the voltage regulator 308B is zero because neither of the processors 304C or 304D are executing any tasks.

Returning to FIG. 4, as indicated by block 410, for each task scheduling case, a total regulator input power may be determined by summing the input power levels of all voltage regulators. For the task scheduling case shown in FIG. 3A, in which the input power level of the voltage regulator 308A is 5.65 W, and the input power level of the voltage regulator 308B is zero, the total regulator input power is 5.65 W.

The steps described above with regard to blocks 408 and 410 are performed for each task scheduling case, yielding an input power level of each voltage regulator. The following exemplary calculations may be performed for the task scheduling cases shown in FIGS. 3B and 3C. Note that in this example the calculations for the task scheduling cases shown in FIGS. 3B and 3C are identical to each other, as it is not significant to the calculations whether the additional or second task 306B executes on the processor 304C or the processor 304D.

For the task scheduling cases shown in FIGS. 3B and 3C, based on the task performance level for the additional or second task 306B, the scheduler 302 may, in the same manner described above for the first task scheduling case, determine that the processor 304C or 304D would require 2.14 W to sustain execution of the second task 306B. As there are no other tasks executing on the processors 304C or 304D in this example, the output power level of the voltage regulator 308B is 2.14 W.

The output power of the voltage regulator 308B may be modified by adding the power supply plane loss. If the measured output voltage is, for example, 0.769V, the output current of the voltage regulator 308B is 2.14 W/0.769V=2.82 A. If the path resistance is, for example, 3 milliohms, then a power supply plane loss of $(2.82)^2 \times (0.003)$ or 0.023 may be added to the above-calculated voltage regulator output power of 2.14 W, resulting in a modified output power level of the voltage regulator 308B of 2.163 W.

Referring again to FIG. 5, for the task scheduling cases shown in FIGS. 3B and 3C the voltage regulator load current is 2.163 W/0.769V=2.84 A. The curve 502 indicates that at a load current level of 2.84 A, the efficiency level of the voltage regulator 308B is 82.5% or 0.825. Therefore, for the task scheduling cases shown in FIGS. 3B and 3C the input power level of the voltage regulator 308B is 2.163/0.825=2.616 W. The input power level of the voltage regulator 308A is also 2.616 W because the same conditions apply to both voltage regulators 308A and 308B in this example. That is, each of the voltage regulators 308A and 308B is supplying one processor operating at a similar performance level.

Returning to FIG. 4, as indicated by block 410, a total regulator input power for each task scheduling case may be determined by summing the input power levels of all voltage regulators. For the task scheduling cases shown in FIG. 3A, in which the input power level of the voltage regulator 308A is 5.65 W, and the input power level of the voltage regulator 308B is zero, the total regulator input power is 5.65 W. For the task scheduling case shown in FIG. 3B, in which the input power level of the voltage regulator 308A is 2.616 W, and the input power level of the voltage regulator 308B is 2.616 W, the total regulator input power is 5.23 W. For the task scheduling case shown in FIG. 3C, in which the input power level of the voltage regulator 308A is 2.616 W, and the input power level of the voltage regulator 308B is 2.616 W, the total regulator input power is 5.23 W.

As indicated by block 412, the task scheduling case having the lowest total regulator input power may be selected. In the example described above, the total regulator input power for the task scheduling cases shown in FIGS. 3B and 3C are each 5.23 W, while the total regulator input power for the task scheduling case shown in FIG. 3A is 5.65 W. Accordingly, the task scheduler 302 may select either the task scheduling case shown in FIG. 3B or the task scheduling case shown in FIG. 3C. In an example such as this, in which two or more task scheduling cases equally have the lowest total regulator input power, one may be selected in any manner, such as by a predetermined order or index, randomly, etc.

As indicated by block 414, the additional task may then be executed on the processor associated with the selected task scheduling case. In the above-described example, if the task scheduling case shown in FIG. 3B is selected, the second task 306B may be executed on the processor 304C. If the task scheduling case shown in FIG. 3C is selected, the second task 306B may be executed on the processor 304D.

Note that if the regulator power level determination were not based in part on regulator efficiency (i.e., loss), a calculation of total power consumption would produce the same result in each of the three task scheduling cases in the foregoing example. In the task scheduling case shown in FIG. 3A, the result of calculating total power consumption without taking into account regulator efficiency would be 4.28 W, as it would be determined that 2.14 W is consumed by the processor 304A and 2.14 W is consumed by the processor 304B. In the task scheduling case shown in FIG. 3B, the result of calculating total power consumption without taking into account regulator efficiency would also be 4.28 W, as it would be determined that 2.14 W is consumed by the processor 304A and 2.14 W is consumed by the processor 304C. In the task scheduling case shown in FIG. 3C, the result of calculating total power consumption without taking into account regulator efficiency would be 4.28 W, as it would be determined that 2.14 W is consumed by the processor 304A and 2.14 W is consumed by the processor 304D. Based on the results of calculating total power consumption without taking into account regulator efficiency, a conventional task scheduler (not shown) might execute the additional or second task 306B task on the processor 304B, yet the example described above of the method 300 reveals that it would be more power-efficient to execute the second task 306B on the processor 304C or 304D than the processor 304B.

Figure 6:
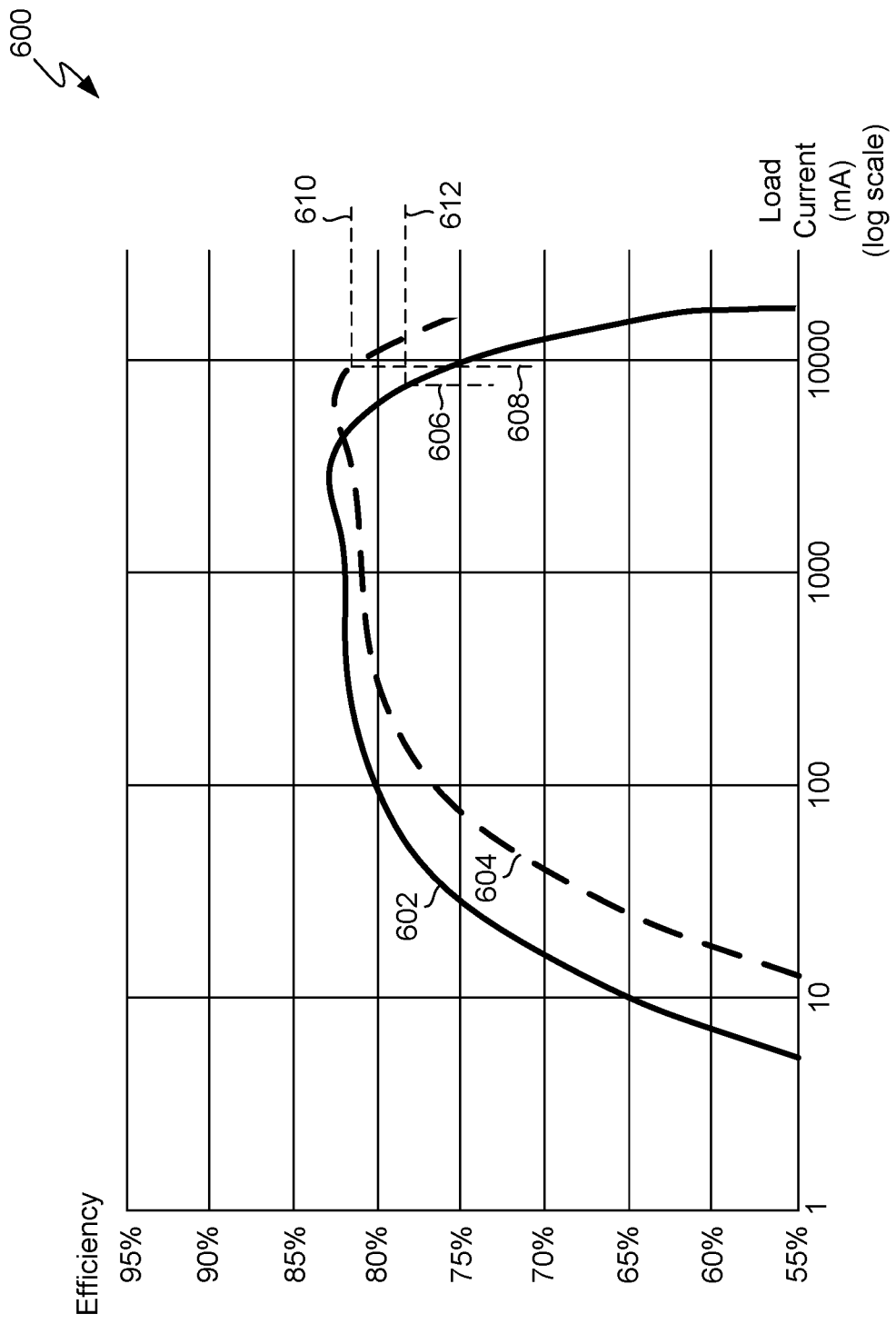
FIG. 6 is similar to FIG. 5, showing examples of voltage regulator efficiency curves for two different voltage regulators.

As illustrated in FIG. 6, a graph 600 comprises a first load current-versus-efficiency curve 602 for a first voltage regulator and a second load current-versus-efficiency curve 604 for a second voltage regulator. The first and second voltage regulators may be, for example, the voltage regulators 108B and 108A (FIG. 1), respectively. As described above with regard to FIG. 1, the cores 104A and 104B of the first cluster 106A that are supplied by the voltage regulator 108A may be configured to sustain a higher processing load than the cores 104C and 104D of the second cluster 106B that are supplied by the voltage regulator 108B. Accordingly, the voltage regulator 108A may be configured to supply more current at high processing loads than the voltage regulator 108B. For example, the voltage regulator 108A may have a higher phase count, larger inductors, etc., than the voltage regulator 108B. Accordingly, at higher current levels the voltage regulator 108B may be more efficient than the voltage regulator 108A. At some exemplary processing load (i.e., number of MIPS), the current 606 drawn by the voltage regulator 108B may be lower than the current 608 drawn by the voltage regulator 108A. Disregarding regulator efficiency, a conventional task scheduler may determine that an additional task is to execute on one of the cores 104C and 104D. Nevertheless, at that processing load the efficiency 610 of the voltage regulator 108A may be higher than the efficiency 612 of the voltage regulator 108B. The task scheduler 302, basing the determination in part on regulator efficiency, may determine that an additional task is to execute on the core 104B.

Figure 7:
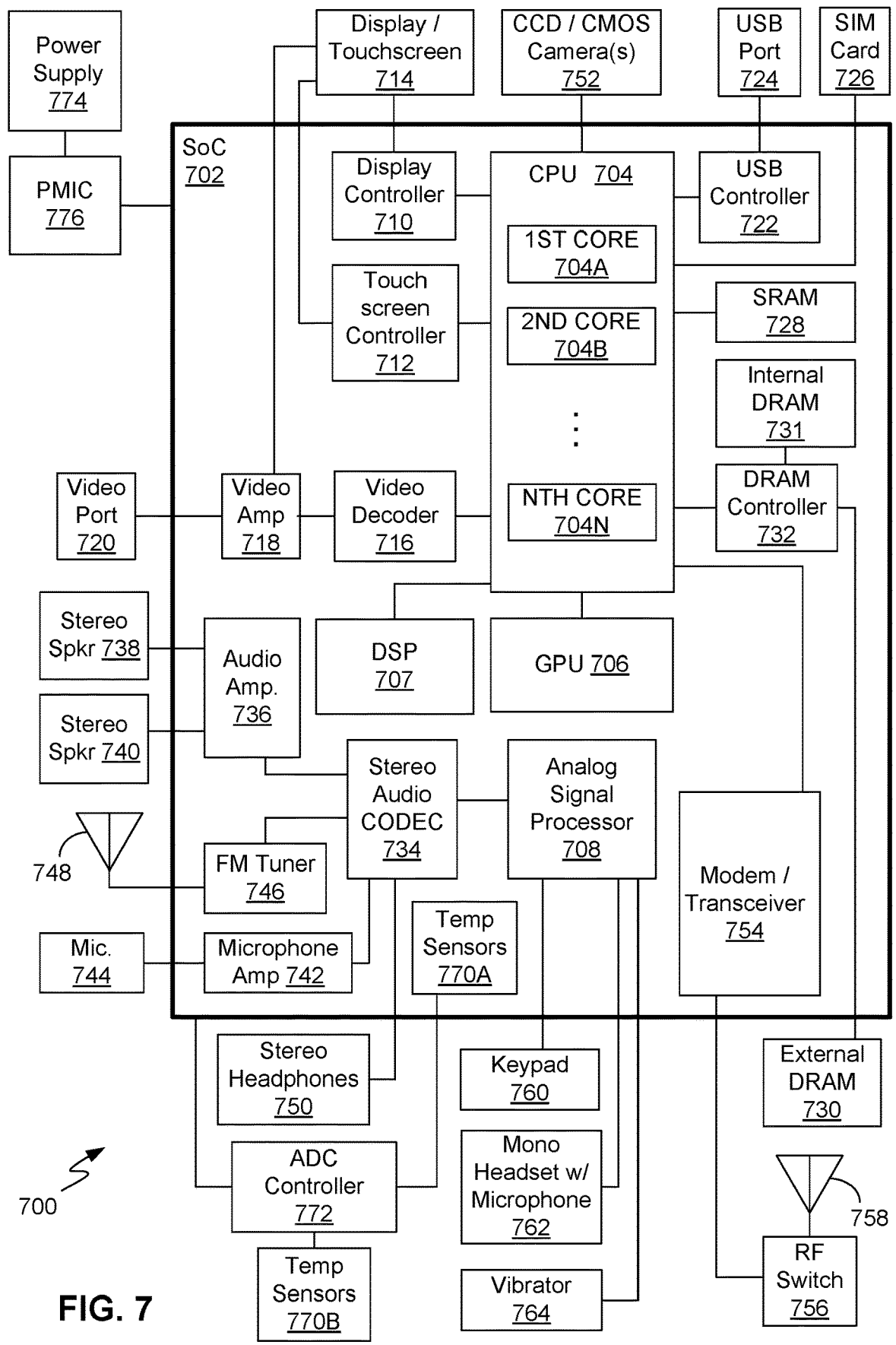
FIG. 7 is a block diagram of a portable computing device, in accordance with exemplary embodiments.

As illustrated in FIG. 7, exemplary embodiments of systems and methods for task scheduling in a computing device may be provided in a portable computing device ("PCD") 700. The PCD 700 may be an example of the computing device 100 described above with regard to FIG. 1.

The PCD 700 may include an SoC 702. The SoC 702 may include a CPU 704, a GPU 706, a DSP 707, an analog signal processor 708, or other processors. The CPU 704 may include multiple cores, such as a first core 704A, a second core 704B, etc., through an Nth core 704N. In some examples of the SoC 702, the CPU 704 may be referred to as an application processor.

A display controller 710 and a touch-screen controller 712 may be coupled to the CPU 704. A touchscreen display 714 external to the SoC 702 may be coupled to the display controller 710 and the touch-screen controller 712. The PCD 700 may further include a video decoder 716 coupled to the CPU 704. A video amplifier 718 may be coupled to the video decoder 716 and the touchscreen display 714. A video port 720 may be coupled to the video amplifier 718. A universal serial bus ("USB") controller 722 may also be coupled to CPU 704, and a USB port 724 may be coupled to the USB controller 722. A subscriber identity module ("SIM") card 726 may also be coupled to the CPU 704.

One or more memories may be coupled to the CPU 704. The one or more memories may include both volatile and non-volatile memories. Examples of volatile memories include static random access memory ("SRAM") 728 and dynamic RAMs ("DRAM"s) 730 and 731. Such memories may be external to the SoC 702, such as the DRAM 730, or internal to the SoC 702, such as the DRAM 731. A DRAM controller 732 coupled to the CPU 704 may control the writing of data to, and reading of data from, the DRAMs 730 and 731. In other embodiments, such a DRAM controller may be included within a processor, such as the CPU 704.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation ("FM") radio tuner 746 may be coupled to the stereo audio CODEC 734. An FM antenna 748 may be coupled to the FM radio tuner 746. Further, stereo headphones 750 may be coupled to the stereo audio CODEC 734. Other devices that may be coupled to the CPU 704 include one or more digital (e.g., CCD or CMOS) cameras 752. In addition, a keypad 760, a mono headset with a microphone 762, and a vibrator device 764 may be coupled to the analog signal processor 708.

A radio frequency (RF) transceiver or modem 754 may be coupled to the analog signal processor 708 and CPU 704. An RF switch 756 may be coupled to the modem 754 and an RF antenna 758.

The SoC 702 may have one or more internal or on-chip thermal sensors 770A and may be coupled to one or more external or off-chip thermal sensors 770B. An analog-to-digital converter ("ADC") controller 772 may convert voltage drops produced by the thermal sensors 770A and 770B to digital signals. A power supply 774 and a power management integrated circuit ("PMIC") 776 may supply power to the SoC 702.

Firmware or software may be stored in any of the above-described memories, such as DRAM 730 or 731, SRAM 728, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Alternative embodiments will become apparent to one of ordinary skill in the art to which the invention pertains. Therefore, although selected aspects have been illustrated and described in detail, it will be understood that various substitutions and alterations may be made therein.

Implementation examples are described in the following numbered clauses:

1. A method for task scheduling in a computing device, comprising:
   receiving a task comprising a task performance level indication;
   determining a plurality of task scheduling cases, each task scheduling case representing execution of the task on an associated processor of a plurality of processors concurrently with one or more other tasks executing on the plurality of processors, each processor supplied by a voltage regulator of a plurality of voltage regulators;
   determining, for each task scheduling case, a total regulator input power level of the plurality of voltage regulators;
   selecting one of the task scheduling cases having a lowest total regulator input power level among the plurality of task scheduling cases; and
   executing the task on a processor associated with the selected one of the task scheduling cases.

2. The method of clause 1, wherein determining, for each task scheduling case, the total regulator input power level comprises:
   determining, for each task scheduling case, a regulator input power level of each of the plurality of voltage regulators based on the task performance level indication, the one or more other tasks executing on the plurality of processors, and an efficiency level of each voltage regulator; and
   determining, for each task scheduling case, the total regulator input power level based on the plurality of task scheduling cases by summing the regulator input power levels of the plurality of voltage regulators.

3. The method of clause 2, wherein determining the regulator input power level of each of the plurality of voltage regulators comprises, for one of the voltage regulators:
   determining a regulator output current level for the one of the voltage regulators;
   determining the efficiency level of the one of the voltage regulators based on the regulator output current level and an efficiency model of the one of the voltage regulators; and
   determining the regulator input power level based on the regulator output current level and the efficiency level.

4. The method of clause 3, wherein determining the regulator output current level comprises:
   determining a processor power level for each processor supplied by the one of the voltage regulators;
   summing the processor power levels for all processors supplied by the one of the voltage regulators; and
   dividing a sum of the processor power levels for all processors supplied by the one of the voltage regulators by an output voltage of the one of the voltage regulators.

5. The method of clause 3, wherein determining the regulator output current level further comprises:
   determining a power supply plane loss; and
   adjusting the sum of the processor power levels by adding the power supply plane loss to the sum of the processor power levels before dividing the sum of the processor power levels by the output voltage.

6. The method of clause 5, wherein determining the regulator input power level comprises dividing the regulator output power level by the efficiency level.

7. The method of clause 1, wherein the plurality of processors comprises:
   a first cluster comprising a plurality of higher-performance processors supplied by a first voltage regulator; and
   a second cluster comprising a plurality of lower-performance processors supplied by a second voltage regulator.

8. The method of clause 1, wherein each of the plurality of processors comprises a chiplet supplied by a corresponding voltage regulator.

9. A system for task scheduling in a computing device, comprising:
   a plurality of processors;
   a task scheduler; and
   a plurality of voltage regulators;
   wherein the task scheduler is configured to:
   receive a task comprising a task performance level indication;
   determine a plurality of task scheduling cases, each task scheduling case representing execution of the task on an associated processor of a plurality of processors concurrently with one or more other tasks executing on the plurality of processors, each processor supplied by a voltage regulator of a plurality of voltage regulators;
   determine, for each task scheduling case, a total regulator input power level of the plurality of voltage regulators;
   select one of the task scheduling cases having a lowest total regulator input power level among the plurality of task scheduling cases; and
   execute the task on a processor associated with the selected one of the task scheduling cases.

10. The system of clause 9, wherein the task scheduler is configured to determine, for each task scheduling case, the total regulator input power level by being configured to:
   determine, for each task scheduling case, a regulator input power level of each of the plurality of voltage regulators based on the task performance level indication, the one or more other tasks executing on the plurality of processors, and an efficiency level of each voltage regulator; and
   determine, for each task scheduling case, the total regulator input power level by summing the regulator input power levels of the plurality of voltage regulators;

11. The system of clause 10, wherein the task scheduler is configured to determine the regulator input power level of each of the plurality of voltage regulators by being configured, for one of the voltage regulators, to:
   determine a regulator output current level for the one of the voltage regulators;

determine the efficiency level of the one of the voltage regulators based on the regulator output current level and an efficiency model of the one of the voltage regulators; and determine the regulator input power level based on the regulator output current level and the efficiency level.

12. The system of clause 11, wherein the task scheduler is configured to determine the regulator output current level by being configured to:

determine a processor power level for each processor supplied by the one of the voltage regulators;

sum the processor power levels for all processors supplied by the one of the voltage regulators; and divide a sum of the processor power levels for all processors supplied by the one of the voltage regulators by an output voltage of the one of the voltage regulators.

13. The system of clause 11, wherein the task scheduler is configured to determine the regulator output current level by further being configured to:

determine a power supply plane loss; and adjust the sum of the processor power levels by adding the power supply plane loss to the sum of the processor power levels before dividing the sum of the processor power levels by the output voltage.

14. The system of clause 13, wherein the task scheduler is configured to determine the regulator input power level by dividing the regulator output power level by the efficiency level.

15. The system of clause 9, wherein the plurality of processors comprises:

a first cluster comprising at least one higher-performance processor; and a second cluster comprising at least one lower-performance processor.

16. The system of clause 15, wherein:

the at least one higher-performance processor of the first cluster is supplied by a first voltage regulator; and the at least one lower-performance processor of the second cluster is supplied by a second voltage regulator.

17. The system of clause 16, wherein:

the first cluster comprises a plurality of higher-performance processors, each supplied by the first voltage regulator; and the second cluster comprises a plurality of lower-performance processors, each supplied by the second voltage regulator.

18. The system of clause 9, wherein each of the plurality of processors comprises a chiplet supplied by a corresponding voltage regulator.

19. A system for task scheduling in a computing device, comprising:

means for receiving a task comprising a task performance level indication;

means for determining a plurality of task scheduling cases, each task scheduling case representing execution of the task on an associated processor of a plurality of processors concurrently with one or more other tasks executing on the plurality of processors, each processor supplied by a voltage regulator of a plurality of voltage regulators;

means for determining, for each task scheduling case, a total regulator input power level of the plurality of voltage regulators;

means for selecting one of the task scheduling cases having a lowest total regulator input power level among the plurality of task scheduling cases; and means for executing the task on a processor associated with the selected one of the task scheduling cases.

20. The system of clause 19, wherein the means for determining, for each task scheduling case, the total regulator input power level comprises:

means for determining, for each task scheduling case, a regulator input power level of each of the plurality of voltage regulators based on the task performance level indication, the one or more other tasks executing on the plurality of processors, and an efficiency level of each voltage regulator; and means for determining, for each task scheduling case, the total regulator input power level by summing the regulator input power levels of the plurality of voltage regulators;

21. The system of clause 20, wherein the means for determining the regulator input power level of each of the plurality of voltage regulators comprises, for one of the voltage regulators:

means for determining a regulator output current level for the one of the voltage regulators;

means for determining the efficiency level of the one of the voltage regulators based on the regulator output current level and an efficiency model of the one of the voltage regulators; and means for determining the regulator input power level based on the regulator output current level and the efficiency level.

22. The system of clause 21, wherein the means for determining the regulator output current level comprises:

means for determining a processor power level for each processor supplied by the one of the voltage regulators;

means for summing the processor power levels for all processors supplied by the one of the voltage regulators; and means for dividing a sum of the processor power levels for all processors supplied by the one of the voltage regulators by an output voltage of the one of the voltage regulators.

23. The system of clause 21, wherein the means for determining the regulator output current level further comprises:

means for determining a power supply plane loss; and means for adjusting the sum of the processor power levels by adding the power supply plane loss to the sum of the processor power levels before dividing the sum of the processor power levels by the output voltage.

24. The system of clause 23, wherein the means for determining the regulator input power level comprises means for dividing the regulator output power level by the efficiency level.

25. The system of clause 19, wherein the plurality of processors comprises:

a first cluster comprising at least one higher-performance processor; and a second cluster comprising at least one lower-performance processor.

26. The system of clause 25, wherein:

the at least one higher-performance processor of the first cluster is supplied by a first voltage regulator; and the at least one lower-performance processor of the second cluster is supplied by a second voltage regulator.

27. The system of clause 26, wherein:

the first cluster comprises a plurality of higher-performance processors, each supplied by the first voltage regulator; and the second cluster comprises a plurality of lower-performance processors, each supplied by the second voltage regulator.

28. The system of clause 19, wherein each of the plurality of processors comprises a chiplet supplied by a corresponding voltage regulator.

29. A computer readable medium for task scheduling in a computing device, the computer readable medium comprising a non-transitory computer-readable medium having stored thereon in computer-executable form instructions that when executed by a processing system of the computing device configure the processing system to:

receive a task comprising a task performance level indication;

determine a plurality of task scheduling cases, each task scheduling case representing execution of the task on an associated processor of a plurality of processors concurrently with one or more other tasks executing on the plurality of processors, each processor supplied by a voltage regulator of a plurality of voltage regulators;

determine, for each task scheduling case, a total regulator input power level of the plurality of voltage regulators;

select one of the task scheduling cases having a lowest total regulator input power level among the plurality of task scheduling cases; and execute the task on a processor associated with the selected one of the task scheduling cases.

30. The computer readable medium of clause 29, wherein the instructions configure the processing system to determine, for each task scheduling case, the total regulator input power level by configuring the processing system to:

determine, for each task scheduling case, a regulator input power level of each of the plurality of voltage regulators based on the task performance level indication, the one or more other tasks executing on the plurality of processors, and an efficiency level of each voltage regulator; and determine, for each task scheduling case, the total regulator input power level by summing the regulator input power levels of the plurality of voltage regulators;

31. The computer readable medium of clause 30, wherein the instructions configure the processing system to determine the regulator input power level of each of the plurality of voltage regulators by configuring the processing system, for one of the voltage regulators, to:

determine a regulator output current level for the one of the voltage regulators;

determine the efficiency level of the one of the voltage regulators based on the regulator output current level and an efficiency model of the one of the voltage regulators; and determine the regulator input power level based on the regulator output current level and the efficiency level.

32. The computer readable medium of clause 31, wherein the instructions configure the processing system to determine the regulator output current level by configuring the processing system to:

determine a processor power level for each processor supplied by the one of the voltage regulators;

sum the processor power levels for all processors supplied by the one of the voltage regulators; and divide a sum of the processor power levels for all processors supplied by the one of the voltage regulators by an output voltage of the one of the voltage regulators.

33. The computer readable medium of clause 32, wherein the instructions configure the processing system to determine the regulator output current level by further configuring the processing system to:

determine a power supply plane loss; and adjust the sum of the processor power levels by adding the power supply plane loss to the sum of the processor power levels before dividing the sum of the processor power levels by the output voltage.

34. The computer readable medium of clause 33, wherein the instructions configure the processing system to determine the regulator input power level by dividing the regulator output power level by the efficiency level.

What is claimed is:

1. A method for task scheduling in a computing device, comprising:

receiving a task comprising a task performance level indication;

determining a plurality of task scheduling cases, each task scheduling case representing execution of the task on an associated processor of a plurality of processors concurrently with one or more other tasks executing on the plurality of processors, each processor supplied by a voltage regulator of a plurality of voltage regulators;

determining, for each task scheduling case, a total regulator input power level of the plurality of voltage regulators;

selecting one of the task scheduling cases having a lowest total regulator input power level among the plurality of task scheduling cases; and executing the task on a processor associated with the selected one of the task scheduling cases.

2. The method of claim 1, wherein determining, for each task scheduling case, the total regulator input power level comprises:

determining, for each task scheduling case, a regulator input power level of each of the plurality of voltage regulators based on the task performance level indication, the one or more other tasks executing on the plurality of processors, and an efficiency level of each voltage regulator; and determining, for each task scheduling case, the total regulator input power level based on the plurality of task scheduling cases by summing the regulator input power levels of the plurality of voltage regulators.

3. The method of claim 2, wherein determining the regulator input power level of each of the plurality of voltage regulators comprises, for one of the voltage regulators:

determining a regulator output current level for the one of the voltage regulators;

determining the efficiency level of the one of the voltage regulators based on the regulator output current level and an efficiency model of the one of the voltage regulators; and determining the regulator input power level based on the regulator output current level and the efficiency level.

4. The method of claim 3, wherein determining the regulator output current level comprises:

determining a processor power level for each processor supplied by the one of the voltage regulators;

summing the processor power levels for all processors supplied by the one of the voltage regulators; and dividing a sum of the processor power levels for all processors supplied by the one of the voltage regulators by an output voltage of the one of the voltage regulators.

5. The method of claim 3, wherein determining the regulator output current level further comprises:

determining a power supply plane loss; and adjusting the sum of the processor power levels by adding the power supply plane loss to the sum of the processor power levels before dividing the sum of the processor power levels by the output voltage.

6. The method of claim 5, wherein determining the regulator input power level comprises dividing the regulator output power level by the efficiency level.

7. The method of claim 1, wherein the plurality of processors comprises:
a first cluster comprising a plurality of higher-performance processors supplied by a first voltage regulator; and
a second cluster comprising a plurality of lower-performance processors supplied by a second voltage regulator.

8. The method of claim 1, wherein each of the plurality of processors comprises a chiplet supplied by a corresponding voltage regulator.

9. A system for task scheduling in a computing device, comprising:
a plurality of processors;
a task scheduler; and
a plurality of voltage regulators;
wherein the task scheduler is configured to:
receive a task comprising a task performance level indication;
determine a plurality of task scheduling cases, each task scheduling case representing execution of the task on an associated processor of a plurality of processors concurrently with one or more other tasks executing on the plurality of processors, each processor supplied by a voltage regulator of a plurality of voltage regulators;
determine, for each task scheduling case, a total regulator input power level of the plurality of voltage regulators;
select one of the task scheduling cases having a lowest total regulator input power level among the plurality of task scheduling cases; and
execute the task on a processor associated with the selected one of the task scheduling cases.

10. The system of claim 9, wherein the task scheduler is configured to determine, for each task scheduling case, the total regulator input power level by being configured to:
determine, for each task scheduling case, a regulator input power level of each of the plurality of voltage regulators based on the task performance level indication, the one or more other tasks executing on the plurality of processors, and an efficiency level of each voltage regulator; and
determine, for each task scheduling case, the total regulator input power level by summing the regulator input power levels of the plurality of voltage regulators.

11. The system of claim 10, wherein the task scheduler is configured to determine the regulator input power level of each of the plurality of voltage regulators by being configured, for one of the voltage regulators, to:
determine a regulator output current level for the one of the voltage regulators;
determine the efficiency level of the one of the voltage regulators based on the regulator output current level and an efficiency model of the one of the voltage regulators; and
determine the regulator input power level based on the regulator output current level and the efficiency level.

12. The system of claim 11, wherein the task scheduler is configured to determine the regulator output current level by being configured to:
determine a processor power level for each processor supplied by the one of the voltage regulators;
sum the processor power levels for all processors supplied by the one of the voltage regulators; and
divide a sum of the processor power levels for all processors supplied by the one of the voltage regulators by an output voltage of the one of the voltage regulators.

13. The system of claim 11, wherein the task scheduler is configured to determine the regulator output current level by further being configured to:
determine a power supply plane loss; and
adjust the sum of the processor power levels by adding the power supply plane loss to the sum of the processor power levels before dividing the sum of the processor power levels by the output voltage.

14. The system of claim 13, wherein the task scheduler is configured to determine the regulator input power level by dividing the regulator output power level by the efficiency level.

15. The system of claim 9, wherein the plurality of processors comprises:
a first cluster comprising at least one higher-performance processor; and
a second cluster comprising at least one lower-performance processor.

16. The system of claim 15, wherein:
the at least one higher-performance processor of the first cluster is supplied by a first voltage regulator; and
the at least one lower-performance processor of the second cluster is supplied by a second voltage regulator.

17. The system of claim 16, wherein:
the first cluster comprises a plurality of higher-performance processors, each supplied by the first voltage regulator; and
the second cluster comprises a plurality of lower-performance processors, each supplied by the second voltage regulator.

18. The system of claim 9, wherein each of the plurality of processors comprises a chiplet supplied by a corresponding voltage regulator.

19. A system for task scheduling in a computing device, comprising:
means for receiving a task comprising a task performance level indication;
means for determining a plurality of task scheduling cases, each task scheduling case representing execution of the task on an associated processor of a plurality of processors concurrently with one or more other tasks executing on the plurality of processors, each processor supplied by a voltage regulator of a plurality of voltage regulators;
means for determining, for each task scheduling case, a total regulator input power level of the plurality of voltage regulators;
means for selecting one of the task scheduling cases having a lowest total regulator input power level among the plurality of task scheduling cases; and
means for executing the task on a processor associated with the selected one of the task scheduling cases.

20. The system of claim 19, wherein the means for determining, for each task scheduling case, the total regulator input power level comprises:
means for determining, for each task scheduling case, a regulator input power level of each of the plurality of voltage regulators based on the task performance level indication, the one or more other tasks executing on the plurality of processors, and an efficiency level of each voltage regulator; and means for determining, for each task scheduling case, the total regulator input power level by summing the regulator input power levels of the plurality of voltage regulators.

21. The system of claim 20, wherein the means for determining the regulator input power level of each of the plurality of voltage regulators comprises, for one of the voltage regulators:
means for determining a regulator output current level for the one of the voltage regulators;
means for determining the efficiency level of the one of the voltage regulators based on the regulator output current level and an efficiency model of the one of the voltage regulators; and
means for determining the regulator input power level based on the regulator output current level and the efficiency level.

22. The system of claim 21, wherein the means for determining the regulator output current level comprises:
means for determining a processor power level for each processor supplied by the one of the voltage regulators;
means for summing the processor power levels for all processors supplied by the one of the voltage regulators; and
means for dividing a sum of the processor power levels for all processors supplied by the one of the voltage regulators by an output voltage of the one of the voltage regulators.

23. The system of claim 21, wherein the means for determining the regulator output current level further comprises:
means for determining a power supply plane loss; and
means for adjusting the sum of the processor power levels by adding the power supply plane loss to the sum of the processor power levels before dividing the sum of the processor power levels by the output voltage.

24. The system of claim 23, wherein the means for determining the regulator input power level comprises means for dividing the regulator output power level by the efficiency level.

25. The system of claim 19, wherein the plurality of processors comprises:
a first cluster comprising at least one higher-performance processor; and
a second cluster comprising at least one lower-performance processor.

26. The system of claim 25, wherein:
the at least one higher-performance processor of the first cluster is supplied by a first voltage regulator; and
the at least one lower-performance processor of the second cluster is supplied by a second voltage regulator.

27. The system of claim 26, wherein:
the first cluster comprises a plurality of higher-performance processors, each supplied by the first voltage regulator; and
the second cluster comprises a plurality of lower-performance processors, each supplied by the second voltage regulator.

28. The system of claim 19, wherein each of the plurality of processors comprises a chiplet supplied by a corresponding voltage regulator.

29. A computer readable medium for task scheduling in a computing device, the computer readable medium comprising a non-transitory computer-readable medium having stored thereon in computer-executable form instructions that when executed by a processing system of the computing device configure the processing system to:
receive a task comprising a task performance level indication;
determine a plurality of task scheduling cases, each task scheduling case representing execution of the task on an associated processor of a plurality of processors concurrently with one or more other tasks executing on the plurality of processors, each processor supplied by a voltage regulator of a plurality of voltage regulators;
determine, for each task scheduling case, a total regulator input power level of the plurality of voltage regulators;
select one of the task scheduling cases having a lowest total regulator input power level among the plurality of task scheduling cases; and
execute the task on a processor associated with the selected one of the task scheduling cases.

30. The computer readable medium of claim 29, wherein the instructions configure the processing system to determine, for each task scheduling case, the total regulator input power level by configuring the processing system to:
determine, for each task scheduling case, a regulator input power level of each of the plurality of voltage regulators based on the task performance level indication, the one or more other tasks executing on the plurality of processors, and an efficiency level of each voltage regulator; and
determine, for each task scheduling case, the total regulator input power level by summing the regulator input power levels of the plurality of voltage regulators.

31. The computer readable medium of claim 30, wherein the instructions configure the processing system to determine the regulator input power level of each of the plurality of voltage regulators by configuring the processing system, for one of the voltage regulators, to:
determine a regulator output current level for the one of the voltage regulators;
determine the efficiency level of the one of the voltage regulators based on the regulator output current level and an efficiency model of the one of the voltage regulators; and
determine the regulator input power level based on the regulator output current level and the efficiency level.

32. The computer readable medium of claim 31, wherein the instructions configure the processing system to determine the regulator output current level by configuring the processing system to:
determine a processor power level for each processor supplied by the one of the voltage regulators;
sum the processor power levels for all processors supplied by the one of the voltage regulators; and
divide a sum of the processor power levels for all processors supplied by the one of the voltage regulators by an output voltage of the one of the voltage regulators.

33. The computer readable medium of claim 32, wherein the instructions configure the processing system to determine the regulator output current level by further configuring the processing system to:
determine a power supply plane loss; and
adjust the sum of the processor power levels by adding the power supply plane loss to the sum of the processor power levels before dividing the sum of the processor power levels by the output voltage.

34. The computer readable medium of claim 33, wherein the instructions configure the processing system to determine the regulator input power level by dividing the regulator output power level by the efficiency level.

* * * * *